Nov. 1, 1966  J. W. GREENLEAF, JR  3,282,432
MULTIPLE UNIT BACKWASHING FILTER
Filed Feb. 18, 1963  5 Sheets-Sheet 2
Fig. 2
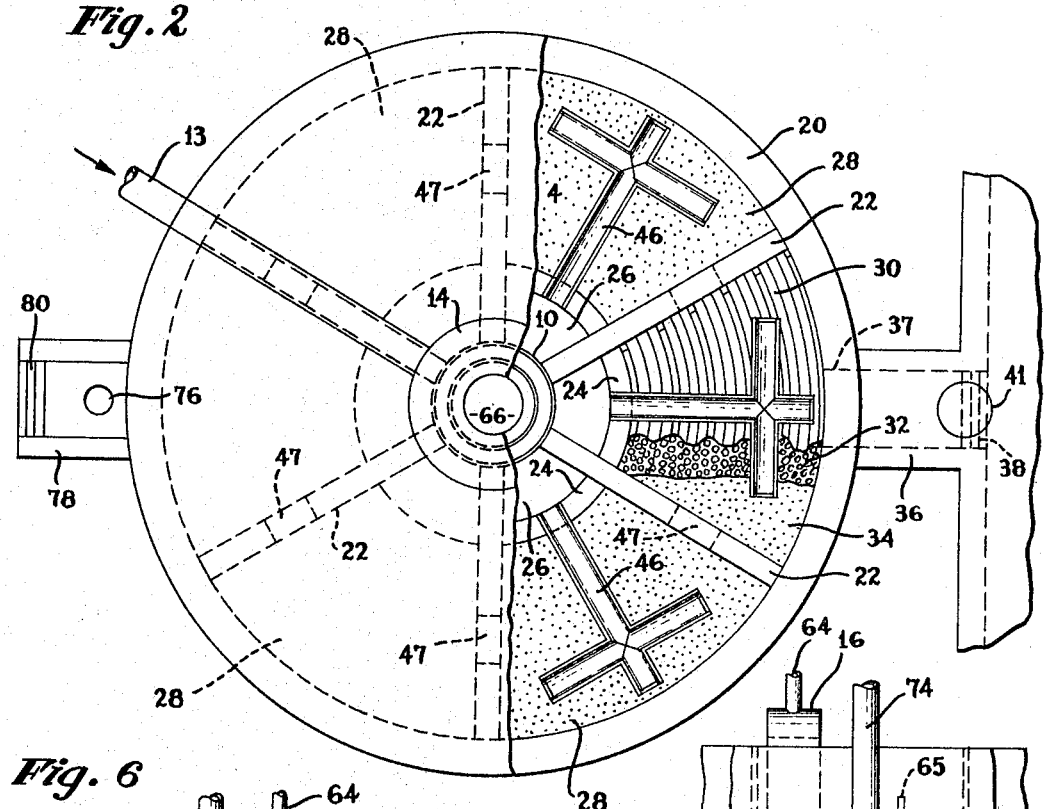
Fig. 6
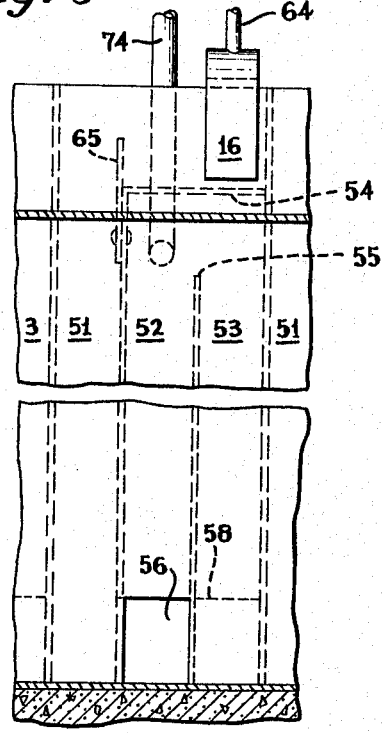
Fig. 7
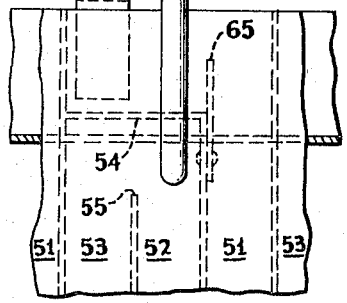
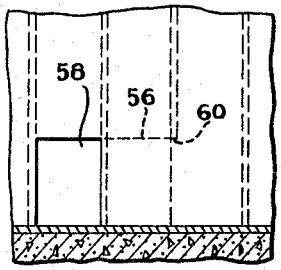
INVENTOR
John W. Greenleaf Jr.
BY Watson, Cole, Grindle & Watson
ATTORNEYS

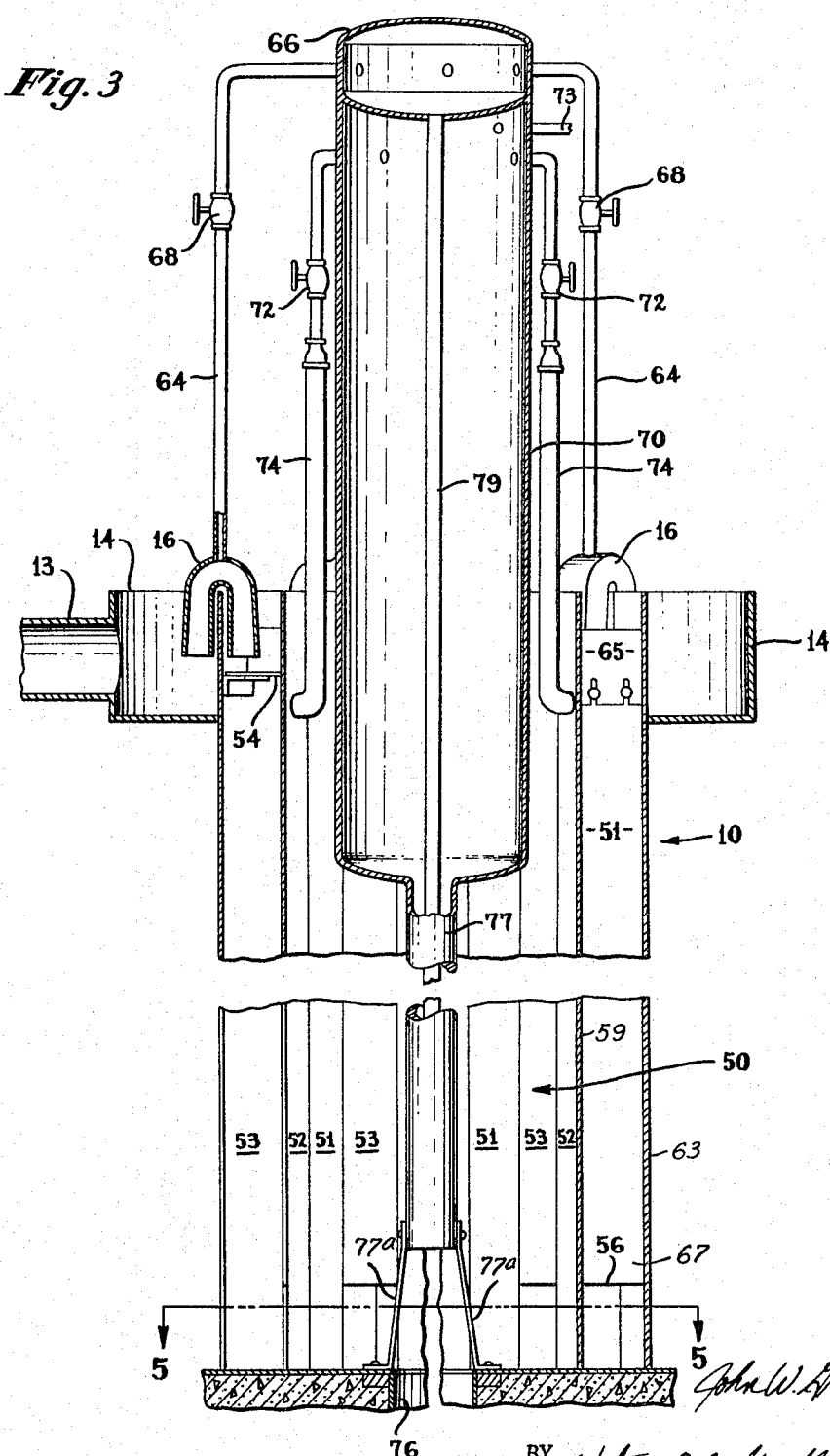

Nov. 1, 1966  J. W. GREENLEAF, JR  3,282,432
MULTIPLE UNIT BACKWASHING FILTER

Filed Feb. 18, 1963  5 Sheets-Sheet 4

INVENTOR
John W. Greenleaf Jr.

BY Watson, Cole, Grindle & Watson
ATTORNEYS

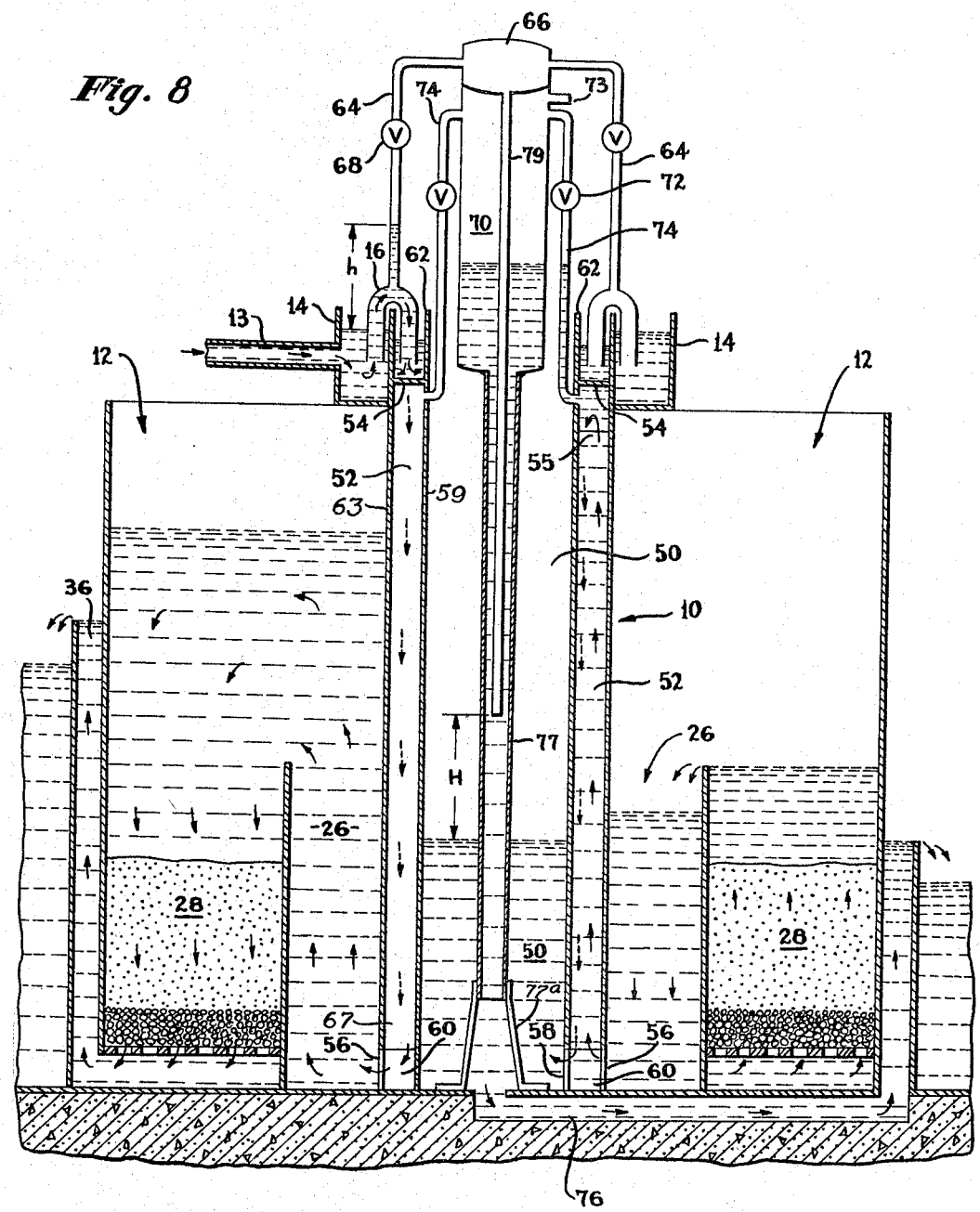

United States Patent Office 3,282,432
Patented Nov. 1, 1966

3,282,432
MULTIPLE UNIT BACKWASHING FILTER
John W. Greenleaf, Jr., Coral Gables, Fla., assignor to Greenleaf Enterprises, Inc., Miami, Fla., a corporation of Florida
Filed Feb. 18, 1963, Ser. No. 259,452
12 Claims. (Cl. 210—264)

This invention relates to improvements in gravity type sand filters of the type which employ multiple filter units having filter beds which are adapted to be individually backwashed. In particular the invention comprises a novel control device or core for individually and selectively controlling the filtering and backwashing cycles of the respective units, as well as the combination of such a control core with the filter units.

It is a primary object of the invention to provide such a control core which can be prefabricated and assembled apart from the filtering units which it is to control.

Further it is an object to provide such a control core in which the various elements necessary to control the filtering and backwashing cycles of the several associated filter units are disposed at a common location and in a readily accessible manner.

It is a further object to provide such a control core around which the various conventional filter units may be readily constructed and with which they may be easily operatively connected with a minimum expense.

A still further object is to provide such a control core in which the flow of liquid is controlled by syphons, with resulting reduction of any clogging tendencies such as are attributable to conventional valves under similar usage.

In accordance with the invention the control core comprises a generally tubular wall structure of substantial radial thickness defining an enclosed central backwash chamber. Within its thickness, the wall structure is formed with ducts arranged to define inlet passages for conveying liquid into the respective filter units during their normal filtering operation and further ducts for each filtering unit defining a backwash syphon for each such unit, each backwash syphon having an intake end communicating with its respective filter unit to withdraw liquid therefrom and a discharge end for delivering said liquid into the backwash chamber within the core. An inlet trough or manifold, which is supported at the upper end of the control core, is adapted to selectively deliver influent from the trough into the inlet core passages under the control of syphons which are adapted to be selectively primed and vented to the atmosphere. Separate means is provided for selectively priming and venting each of the back wash syphons whereby to initiate and discontinue at will the backwashing cycle of its respective filter unit.

Further incidental features and advantages of the invention will be apparent from the following detailed description in conjunction with the accompanying drawings in which:

FIGURE 2 is a plan view of the structure shown in FIGURE 1 with parts broken away to show underlying structure.

FIGURE 3 is an enlarged sectional view on the line 3—3 of FIGURE 4 showing in detail the structure of the control core per se.

FIGURE 6 is a fragmentary section on the line 6—6 of FIGURE 4.

FIGURE 7 is a fragmentary section on the line 7—7 of FIGURE 4, and

FIGURE 8 is a diagrammatic sectional view through the control core and its associated filter units, in which the relative size of the filter core itself is somewhat exaggerated to better show the operational cycles of the units, the flow path through the filter core and an associated filter unit during the filter cycle being depicted on the left-hand side of said figure and the flow path of the liquid during a backwash cycle being depicted on the right-hand side of FIGURE 8.

Figure 1:
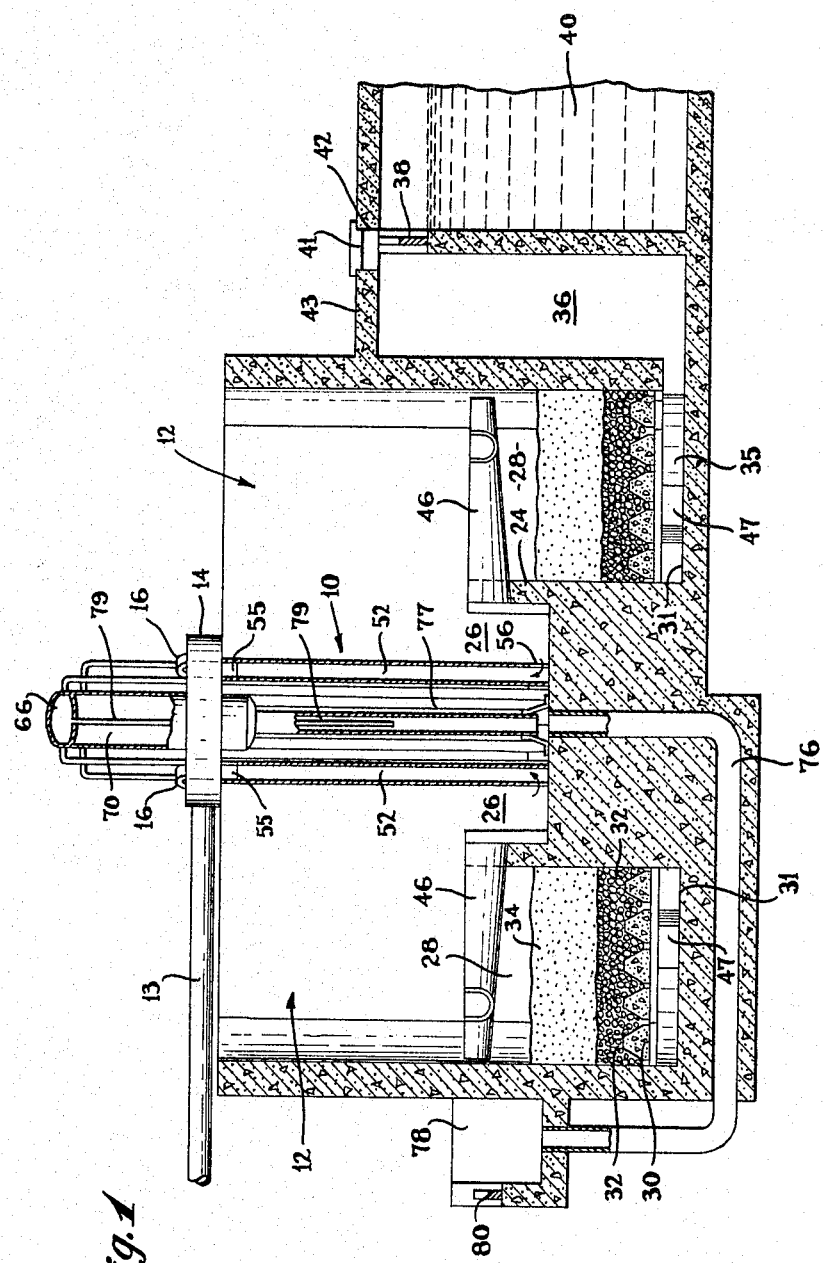
FIGURE 1 is a vertical section through a multiple unit backwashing filter structure incorporating the preferred embodiment of the control core of the invention.
Figure 4:
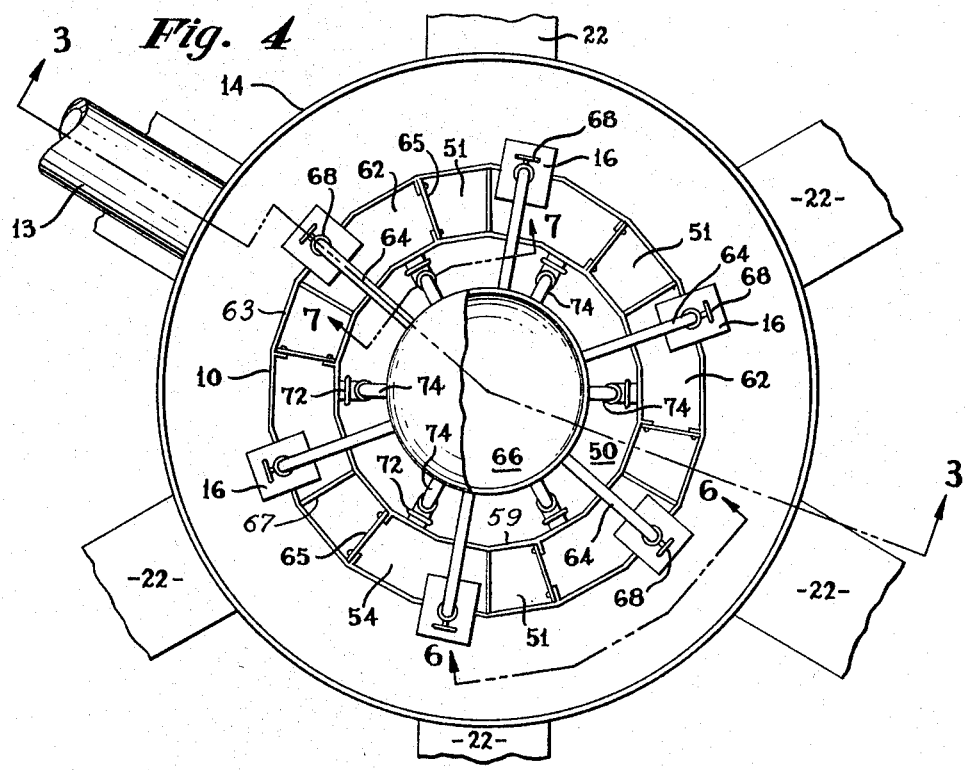
FIGURE 4 is a plan view of the structure shown in FIGURE 3.

Referring now in detail to the accompanying drawings, and first considering FIGURES 1 and 2, the control core of the invention which is generally designated 10 is shown as arranged in one of several possible manners, with a plurality of filter units 12, to control individually the filtering cycle and also the backwashing cycle of each of the several units 12. Preferably before being delivered to the filtering apparatus the conditioned water or sewage will have been allowed to stand in a settling tank or clarifier to cause settling out of the heavier solids, whereupon the supernatant fluid will be delivered through an inlet pipe 13 into an annular receiving trough 14 carried by and encircling the upper end of the core 10. From this trough 14, the influent is delivered selectively through inlet syphons 16 into the core for distribution thereby to the respective filter units 12. The precise manner of such distribution will be hereinafter described in more detail.

The geographical arrangement and distribution of the several units 12 with respect to the control core 10 is subject to quite wide variation in accordance with the invention, it being essential only that the operative connections between the core and the several units be maintained. However, in the present embodiment there is illustrated one particularly advantageous and compact arrangement in which it is possible to establish adequate communication between the core and each of the units without the use of piping.

In accordance with this preferred arrangement, the several filter units 12 are arranged in annular conformation around and concentrically to the control core 10. Thus each filter unit 12 will be seen in this instance to be of substantially wedge-shape in plan, constituting a segment of the annulus jointly formed by all of the units 12. With this arrangement the several filter units may employ a common outer circular wall 20 of concrete or other suitable material and may be subdivided from each other by a plurality of walls 22 of similar material radiating from the control core 10 to the circular wall 20. An inner wall segment 24 divides each filter unit 12 into a filter forebay 26 and a filter compartment 28. Within each filter compartment is provided a horizontal filter bed, illustrated in FIGURE 1, as comprising a plurality of relatively spaced concrete beams defining a generally conventional horizontal grating 30 above the bottom 31 of the compartment. This grating supports a lower layer of gravel 32 on which is superposed an upper layer of sand 34.

Beneath the filter bed grating 30 is an effluent chamber 35. As is shown in FIGURES 1 and 2, the effluent chambers or compartments of all filter units communicate with each other through openings 47 through their respective radial partition walls 22. The effluent from all filter units is thus delivered from one of the effluent chambers 35, through a passage 37 into a filtered water retention tank 36 from which the water is discharged over a weir 38 into a suitable storage tank, reservoir or the like 40. The weir 38 serves to maintain a supply of filtered water at a predetermined level for reverse or backwash flow through a given filter unit in the manner hereinafter described. The weir 38 may be adjustable to permit maintenance of the filtered water level at the optimum height for operation under varying conditions. In order to permit access to the weir 38 for adjustment, an opening 42 may be provided in the horizontal plate or slab 43 which covers the retention tank 36 and storage tank 40. A removal closure plug or lid 41 is normally applied to close said opening.

In accordance with usual practice, the wall 24 which separates each filter bed from its associated forebay 26 extends to a level substantially above the filter bed to maintain a minimum depth of water thereabout at all times during both the filtering cycle and the backwashing cycle. In addition to preventing the incoming turbulent influent from disturbing the sand 34 of the filter bed, each such wall 24 serves as a support for a more or less conventional backwash trough 46, here shown to be of substantially T or cruciform shape, with one end supported in and extending through a conformingly shaped gap in the wall 24. As is well known, such a trough will serve to skim off and carry away the impurities which are carried to the upper surface of the water in each filtering compartment 28 during the backwashing operation.

Generally speaking each of the filter units 12 per se, and its mode of operation is well known in the art and therefore constitutes no part of the present invention.

The novel control core 10 consists essentially of a tubular wall structure of substantial radial thickness which encloses and defines a central chamber 50 for the reception and the disposition of backwash water during the backwash cycle of each of the units 12.

Figure 5:
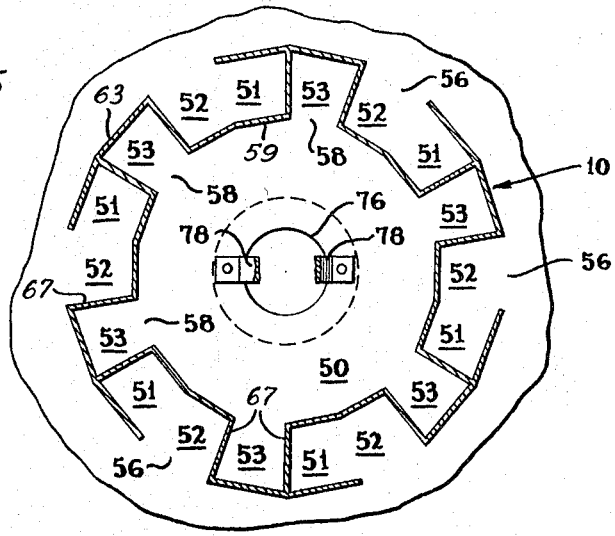
FIGURE 5 is a horizontal section on the line 5—5 of FIGURE 3 showing the arrangement of the ports at the lower ends of the several ducts defined by the filter core.

For each filter unit 12, the central core 10 has its tubular wall structure formed to define therein a plurality of vertical passages or ducts 51, 52 and 53 respectively adjoining each other. By reference to FIGURE 5 of the drawings, it will be noted that the hollow tubular wall structure 10 in its preferred embodiment includes relatively-spaced inner and outer sheet material members 59 and 63. The hollow space between these members is subdivided into the respective vertical ducts or passages 51, 52 and 53 by a series of relatively-spaced webs 67 which interconnect the inner and outer members and cooperate with them to define the respective ducts. Of these, the duct 51 constitutes the inlet duct and is open at its upper end for reception of influent under the control of its associated inlet syphon 16. The other two ducts 52 and 53 have their upper ends closed in fluid tight manner by the cover 54, as shown in each of FIGURES 3, 4, 6, 7 and 8, and the upper ends of the respective passages 52 and 53 are in communication through a port 55, as shown in FIGURES 6, 7 and 8, whereby each such pair of ducts 52 and 53 will function as a backwash syphon, one leg 52 of which communicates with its associated filter forebay 26 through a port 56 at its lower end. The other leg 53 of the backwash syphon communicates with the central chamber 50 through a port 58 at its lower end.

It will be apparent that each inlet duct 51 communicates at its lower end with its associated filter forebay 26 to deliver influent thereinto. In the present embodiment such communication is indirect, that is through a port 60 (FIGURES 6, 7 and 8) opening from the lower end of duct 51 into duct 52, and thence through the port 56 of duct 52 into the filter forebay. However, the duct 51 might equally well communicate directly with the filter forebay.

Considering now in somewhat more detail the specific means for controlling the flow of influent through each duct 51 to its associated filter unit 12, it will be seen from FIGURE 8 that each inlet syphon 16 has its inlet end disposed beneath the water level within the inlet trough 14, while its discharge end is disposed beneath the comparatively lower water level within a weir box 62, shown in FIGURES 3, 4, 6 and 7. The liquid in each weir box 62 is maintained at the desired predetermined level preferably by means of an adjustable weir 65 over the upper edge of which the liquid is discharged into the upper end of an adjoining intake duct 51, and thence into the forebay 26 of one of the filter units 12.

The filtering cycle of any given filter unit 12 may be initiated and discontinued as desired through the expedients of priming its associated inlet syphon 16 to initiate a flow therethrough and of venting it to the atmosphere when it is desired to discontinue the flow. Means for thus selectively either priming or venting each such syphon 16 is shown as comprising a conduit 64 in communication both with the closed upper end of the syphon 16 and with a vacuum tank 66 which may be maintained partially evacuated at all times by a suitable vacuum pump or the like (not shown) though the degree of evacuation preferably will be insufficient to raise the liquid level upwardly from the syphon to the height of the vacuum tank, it being necessary simply that the air be withdrawn completely from the syphon 16 itself. There is interposed in the line 64 a three-way manually actuated control valve 68, arranged so that it may be actuated either to establish communication between the syphon 16 and the vacuum tank or to vent the syphon 16 to the atmosphere. In the latter case, the syphoning action will be discontinued, as will the flow of influent liquid to the filter unit 12 controlled by said syphon 16.

For instituting a backwash flow of liquid from any given filter unit 12 into the inner chamber 50, each of the backwash syphons comprised by the adjoining pairs of ducts 52 and 53, similarly has associated therewith a source of vacuum exemplified by the enclosed vacuum tank 70 which may be selectively placed in communication with each of the said backwash syphons 52, 53 under the control of a valve 72 interposed in the conduit 74 extending between each such syphon and vacuum tank 70. The valves 72 are similar to the valves 68 and each is thus capable of selectively priming its associated syphon by placing it in communication with the vacuum tank 70 or alternatively the said valve is capable of venting its associated syphon to the atmosphere to discontinue the backwashing cycle. Specifically it will be noted that the vacuum pipes or conduits 74 extend downwardly into the upper end of the inner chamber 50 and thence radially outwardly into communication with the upper end of each duct 53 at a level above the lower edge of the port 55 between each said duct 53 and its associated duct 52.

Inasmuch as the source of vacuum within the tank 70 must be relied upon to draw the liquid upwardly in any given duct or syphon leg 53 to a considerably greater height than is required in connection with the syphon 16, the tank 70 will normally be evacuated by known means to a considerably greater degree than the tank 66 so that relatively speaking the tank 70 may be regarded as a high vacuum tank and the tank 66 as a low vacuum tank. As is shown in FIGURE 3 the tank 66 may be supported at the upper end of the tank 70, and the latter may be supported concentrically within the inner compartment 50 of the control core by means of the depending standard 77 and the supporting brackets 78, secured to the bottom of central chamber 50.

The water within the compartment 50 is normally maintained at a constant level above the syphon ports 58 to maintain a water seal and thus to prevent inadvertent venting of the backwash syphons while of course making possible their priming by the evacuating action of the tank 70 and lines 74. Thus as will be seen by reference to FIGURE 1, the backwash water is discharged from the inner chamber 50 through a suitable discharge conduit 76 leading to a weir box 78 from which the water is then discharged over a weir 80 which also serves to maintain the desired water level within the chamber 50. Alternately the level may be maintained by arranging the discharge pipe 76 to have its intake end above the level of ports 58.

While as above mentioned the vacuum tanks 66 and 70 may be evacuated by known means such as separate vacuum pumps equipped with suitable controls for maintaining relative degrees of negative pressure (or pressures below that of the atmosphere) in these tanks, the invention contemplates the preferred use of a particularly novel evacuating means. Such a means requires but a single evacuating pump or the like connected preferably through a conduit 73 the tank 70 which serves the set of backwash syphons 52, 53 which in the present embodiment require the higher degree of evacuation. The vacuum or suction for the inlet syphon 16 is derived from the relatively higher vacuum supplied to the syphons 52, 53. Thus referring to FIGURE 8, the depending standard 77 which in this instance provides support for the tank 70, is in the form of a suction tube having its upper end in communication with the tank 70 through the bottom thereof and its lower end depending into the liquid within the chamber 50. It will be recalled that the liquid is maintained at a predetermined level in the chamber 50.

The low vacuum tank 66 is provided with a suction tube 79 which is shown as depending downwardly through the tank 70 and concentrically into the tube 77 with its open lower end disposed above the predetermined level of liquid within the chamber 50 at a height designated in FIGURE 8 as H. Height H is selected to equal the desired height $h$ in FIGURE 8 to which the column of water is desired to be raised from the inlet trough 14 for the purpose of priming the syphons 16. It will be apparent that the identical reduced pressure which prevails in the column of water within tube 77 at the height H will be transmitted through the suction tube 79, tank 66 and the conduits 64 to the respective syphons 16. Thus by suitably spacing the lower end of tube 79 above the liquid level within chamber 50 the corresponding height $h$ of the water columns associated with the syphons 16, or in other words the relative degree of vacuum transmitted to said syphons may be accurately controlled and maintained at all times.

It will be seen that when any given syphon 16 is primed under the control of its valve 68 the air will be vented from the syphon 16 upwardly through the conduit 64, tank 66 thence downwardly through the tube 79 and discharged from the lower end of the tube into the column of water within the tube 77. The resulting air bubbles will rise through the water in the tube and in the tank 70 to be evacuated through the suction pipe or conduit 73 leading to the single evacuating pump which is thus employed for maintaining the desired differing degrees of vacuum of both sets of syphons.

In the operation of the invention, in order to commence the filtering cycle of a given filter unit 12, as illustrated diagrammatically on the left-hand side of FIGURE 8, the inlet syphon 16 of that unit is primed by suitable actuation of its control valve 68, thereby commencing the inflow of water from the annular trough 14 through the syphon 16 and its associated weir box 62 and into the inlet duct 51 which connects with the said filter unit 12. The incoming influent then is delivered downwardly in duct 51, thence through the port 60 at its lower end, to traverse the lower end of the adjoining duct 52 and be discharged into the forebay 26 of the filter unit through the port 56 of said duct 52. The backwash syphon defined by the adjoining ducts 52 and 53 for the associated unit 12 will be inoperative during the filtering cycle aforementioned.

When any given filter unit has been used for a sufficient period that its filter bed requires backwashing to remove the accumulated slime and foreign matter, the inlet syphon 16 for that filter unit is then vented to the atmosphere by appropriate manipulation of the valve 68 to discontinue the passage of influent into the particular filter unit without affecting the operation of other units.

The control valve 72 for the backwash syphon 52, 53 of the same unit 12 is then actuated to prime the said backwash syphon, thereby withdrawing water from above the filter bed of the unit and into the inner chamber 50 for discharge through the outlet passage 76. As the liquid above the filter bed of the unit reaches a level below that of the filtered water in the retention tank 36, there will be instituted a backflow of water from said tank and upwardly through the filter bed to carry upwardly the slime and foreign material for removal through the backwash trough 46, filter forebay 26 and port 56.

Normally, while a given filter unit 12 is being backwashed, a plurality of the other such units 12 will be maintained in operation and will thus maintain the filtered water in retention tank 36 at an adequate level to continue the backwashing operation over as long a period of time as desired.

Further it will be apparent that the flow of backwashing fluid upwardly through the filter bed of a given unit will commence gradually as the fluid level above the bed is lowered and will increase during continued lowering, thereby achieving a most efficient backwashing operation. The converse will be true upon termination of the backwashing operation, thereby permitting early resumption of efficient filtration.

In this application I have shown and described only the preferred embodiment of my invention simply by way of illustration of the preferred mode of practicing the invention. However I recognize that the invention is capable of other and different embodiments and that its several details may be modified in various ways without departing from the invention.

Accordingly the accompanying drawings and description are to be construed merely as illustrative in nature.

I claim:

1. A control core for a multiple unit gravity filter comprising a vertically disposed tubular wall enclosing and defining a central backwash chamber, said wall being hollow and formed in its hollow interior between the inner and outer faces of the wall to define for each filter unit a vertical influent inlet duct ported at its lower end for communication with said filter unit, and further ducts defining a plurality of backwash syphons each establishing communication between said backwash chamber and one of said filter units, in combination with means for selectively priming and venting each said backwash syphon to initiate and discontinue its operation.

2. A control core for a multiple unit gravity filter comprising a vertically disposed hollow tubular wall, said wall including relatively-spaced inner and outer sheet material members and vertical webs interconnecting said members across the space therebetween, said inner member enclosing and defining a central backwash chamber, a plurality of relatively-spaced webs extending between and interconnecting said members across the hollow interior of said wall, said webs extending vertically and cooperating with said members to define within the wall a plurality of vertical influent inlet ducts, each ported at its lower end for communication with a filter unit, and a plurality of pairs of further vertical ducts, the ducts of each said pair intercommunicating at their upper ends to define a backwash syphon having one end opening outwardly through said wall for communication with a filter unit, and its other end opening into said central backwash chamber, in combination with means supported on said core in communication with the respective backwash syphons for selectively priming and venting each said backwash syphon to initiate and discontinue its operation.

3. A control core for a multiple unit gravity filter comprising a vertically-disposed tubular wall enclosing and defining a central backwash chamber, said wall having formed therein for each filter unit a vertical influent inlet duct ported at its lower end for communication with said filter unit, and further vertical ducts intercommunicating at their upper ends to define a backwash syphon having one end opening outwardly through said wall for communication with said filter unit, and its other end opening into said central chamber, in combination with means for selectively priming and venting each said backwash syphon to initiate and discontinue its operation, an inlet trough carried by said wall at its upper end, said inlet ducts opening upwardly, weir boxes mounted on said wall for discharge into the respective inlet ducts, inlet syphons having their ends projected beneath the liquid levels in said trough and in the respective weir boxes, and means for selectively priming and venting the respective inlet syphons.

4. A control core for a multiple unit gravity filter comprising a vertically-disposed tubular wall enclosing and defining a central backwash chamber, said wall having formed therein for each filter unit a vertical influent inlet duct ported at its lower end for communication with said filter unit, and further vertical ducts intercommunicating at their upper ends to define a backwash syphon having one end opening outwardly through said wall for communication with said filter unit, and its other end opening into said central chamber, in combination with means for selectively priming and venting each said backwash syphon to initiate and discontinue its operation, an inlet trough carried by said wall at its upper end, said inlet ducts opening upwardly, weir boxes mounted on said wall for discharge into the respective inlet ducts, inlet syphons having their inlet ends projected beneath the liquid levels in said trough and in the respective weir boxes, and means for selectively priming and venting the respective inlet syphons, said means for selectively priming and venting the respective inlet and backwash syphons comprising a vacuum source having an operative connection with each said syphon, and a valve interposed in each said connection for selectively establishing communication of each syphon either with said vacuum source or the atmosphere.

5. A control core for a multiple unit gravity filter comprising a vertically disposed tubular wall enclosing and defining a central backwash chamber, said wall having formed therein a plurality of vertical inlet ducts, each having a port opening outwardly through said wall at its lower end for communication with a filter unit, said wall defining a plurality of backwash syphons each establishing communication between said backwash chamber and one of said filter units and arranged, when primed, to convey fluid from the latter to the former, and means carried by said core for selectively priming and venting each said backwash syphon to initiate and discontinue its operation; in combination with an inlet trough carried by said wall at its upper end, said inlet ducts opening upwardly, weir boxes mounted on said wall for discharge into the respective inlet ducts, inlet syphons having their inlet ends projected beneath the liquid levels in said trough and in the respective weir boxes, and means for selectively priming and venting the respective inlet syphons.

6. A multiple unit gravity filter comprising an upright central core, a plurality of filter units, each having a horizontal filter bed, an influent compartment over said bed, an effluent compartment beneath said bed communicating with an effluent chamber, an inlet trough supported at the upper end of said core, said core being formed with inlet passages operative to deliver influent from said trough to the respective units, said core further defining an enclosed central chamber and backwash syphons opening outwardly into communication with the respective filter units below the normal effluent level in said effluent chamber and opening inwardly into communication with said central chamber, said central chamber containing a supply of liquid above said inward openings to provide liquid seals for said syphons, a source of vacuum and means selectively operable to prime each said syphon by connecting it to said source and to vent same by placing it in communication with the atmosphere.

7. A multiple unit backwashing gravity filter comprising a plurality of filter units, each having a horizontal filter bed, a filter compartment over said bed, an effluent compartment beneath said bed, an effluent retention chamber receiving effluent from said effluent compartments, a generally tubular wall structure defining an enclosed central chamber, said wall structure being formed with ducts defining backwash syphons opening outwardly into communication with the respective filter compartments below the normal effluent level in said effluent retention chamber and opening inwardly into communication with said central chamber, said central chamber containing a supply of liquid above said inward openings to provide a liquid seal for said syphons, a source of vacuum and means selectively operable to prime each said syphon by connecting it to said source and to vent same by placing it in communication with the atmosphere.

8. A control core for a multiple unit gravity filter comprising a vertically-disposed tubular wall enclosing and defining a central backwash chamber, said wall having formed therein for each filter unit a vertical influent inlet duct ported at its lower end for communication with said filter unit, and further vertical ducts intercommunicating at their upper ends to define a backwash syphon having one end opening outwardly through said wall for communication with said filter unit, and its other end opening into said central chamber, in combination with means for selectively priming and venting each said backwash syphon to initiate and disconitnue its operation, an inlet trough carried by said wall at its upper end, said inlet ducts opening upwardly, weir boxes mounted on said wall for discharge into the respective inlet ducts, inlet syphons having their inlet ends projected beneath the liquid levels in said trough and in the respective weir boxes, and means for selectively priming and venting the respective inlet syphons, said means for selectively priming and venting the respective inlet and backwash syphons comprising a vacuum source having an operative connection with each said syphon, and a valve interposed in each said connection for selectively establishing communication of each syphon either with said vacuum source or the atmosphere, said backwash chamber having a supply of liquid therein at a constant level, said vacuum source comprising a suction tube having an open end depending into said liquid, means for partially evacuating said tube to maintain a column of liquid therein at a substantially constant height above said constant level, said operative connections communicating with said column of liquid at a predetermined height above said constant level.

9. A control core as defined in claim 8, each said backwash syphon having an operative priming connection to said tube above said column.

10. A chamber in open communication with the atmosphere, said chamber having liquid therein at a substantially constant level, a first suction tank and means supporting said tank above said constant liquid level, a first suction tube communicating with said tank and having an open end depending into said liquid, means for partially evacuating said tank to maintain a column of liquid in said tube at a predetermined height above said constant level, a first syphon having an elevated mid-portion and depending legs for disposition in liquids at different levels, priming and venting means for said syphon comprising a conduit having one end communicating with the elevated portion of said syphon and its other end communicating first suction tank to transmit to said syphon the reduced pressure prevailing in said tank, a second suction tank, a second syphon communicating with said second suction tank, a second suction tube establishing communication between said second suction tank and said first suction tube, said second suction tube communicating with the first suction tube at a fixed level above said constant level of liquid in the said chamber, whereby to maintain in said second suction tank a lesser degree of fluid pressure than in said first suction tank and equal to the pressure prevailing in the first suction tube at said fixed level, a second syphon, and priming and venting means for said second syphon comprising a conduit operatively connecting said second syphon to said second suction tank and a valve in said conduit for selectively establishing communication between said second syphon and the second suction tank and between said second syphon and the atmosphere.

11. A chamber in open communication with the atmosphere, means for maintaining liquid at a constant level in said chamber, a suction tube having an open end depending into said liquid, means for partially evacuating said tube to maintain its interior at a constant reduced pressure below that of the atmosphere, whereby to maintain a column of liquid in said tube above said constant level, and two syphons communicating with the interior of said tube at relatively different heights above said constant level, one of said syphons communicating with said liquid column below its upper end, whereby to maintain a constant ratio between the reduced pressures transmitted to the respective syphons.

12. The combination of claim 11, including means selectively operative to vent each syphon to the atmosphere.

References Cited by the Examiner
UNITED STATES PATENTS

| | | | |
|---|---|---|---|
| 2,395,508 | 2/1946 | Seddig | 210—264 |
| 3,134,735 | 5/1964 | Greenleaf | 210—264 |

REUBEN FRIEDMAN, *Primary Examiner.*

SAMIH N. ZAHARNA, *Examiner.*